United States Patent [19]
Mack et al.

[11] Patent Number: 5,970,051
[45] Date of Patent: Oct. 19, 1999

[54] REDUCTION OF ERRORS IN D4 CHANNEL BANK BY MULTIFRAME COMPARISON OF TRANSMIT ENABLE LEAD TO DETERMINE WHETHER ANALOG CHANNEL UNIT IS INSTALLED IN D4 CHANNEL BANK SLOT

[75] Inventors: David L. Mack, Madison; Michael W. Elliott, Harvest, both of Ala.; Clifford Hall, Austin, Tex.

[73] Assignee: Adtran, Inc., Huntsville, Ala.

[21] Appl. No.: 08/778,078

[22] Filed: Jan. 2, 1997

[51] Int. Cl.[6] .................................................. H04J 1/16
[52] U.S. Cl. ............................................ 370/241; 370/242
[58] Field of Search ..................................... 370/294, 358, 370/532, 535; 371/20.1; 379/1, 4, 22, 27, 29, 825.07

[56] References Cited

U.S. PATENT DOCUMENTS

| | | | |
|---|---|---|---|
| 5,473,665 | 12/1995 | Hall et al. ................................. | 379/29 |
| 5,579,320 | 11/1996 | Hall, III et al. ........................ | 370/101 |
| 5,712,898 | 1/1998 | Hall, III et al. ............................ | 379/29 |
| 5,822,398 | 10/1998 | Hall et al. .................................. | 379/29 |

*Primary Examiner*—Huy D. Vu
*Assistant Examiner*—Alexander Boakye
*Attorney, Agent, or Firm*—Charles E. Wands

[57] ABSTRACT

The problem of digital data corruption heat occurs when an analog card is inserted into a card/time slot of a D4 channel bank is effectively remedied by sampling and analyzing the channel bank's transmit enable (TNEN) lead for successive frames of time slots. Unless analyzed TNEN lead samples of a channel unit time slot of interest derived over successive frames have the same logic state associated with an analog channel unit, the PCM data lead remains default-coupled to a digital data transmission lead. This prevents PCM-encoded spurious noise on the analog PAM lead from being erroneously asserted in place of serialized digital data bits that should have been passed directly from the digital data bus to the PCM bus.

23 Claims, 2 Drawing Sheets

REDUCTION OF ERRORS IN D4 CHANNEL BANK BY MULTIFRAME COMPARISON OF TRANSMIT ENABLE LEAD TO DETERMINE WHETHER ANALOG CHANNEL UNIT IS INSTALLED IN D4 CHANNEL BANK SLOT

CROSS-REFERENCE TO RELATED APPLICATIONS

The present application relates to subject matter described in U.S. patent application Ser. No. 08/706,784 (hereinafter referenced as the '784 application), filed Sep. 3, 1996, by David L. Mack et al, entitled: "Mechanism for Determining Whether Channel Unit is Installed in D4 Channel Bank Slot," assigned to the assignee of the present application and the disclosure of which is herein incorporated.

FIELD OF THE INVENTION

The present invention relates in general to telephone communication systems, and is particularly directed to a modification of a D4 channel bank, such as that described in the above-referenced '784 application, that conducts multi-frame sampling of the channel bank's transmit enable (TNEN) lead to prevent corruption of digital data by a newly installed analog channel unit.

BACKGROUND OF THE INVENTION

FIG. 1 diagrammatically illustrates an AT&T-compatible digital carrier terminal or D4 channel bank 10, such as that manufactured by Adtran Corporation, Huntsville, Ala., through which digital communications may be provided by a digital carrier telephone network to digital signalling equipment located at a customer's premises 20. The channel bank 10 typically contains a line interface unit (LIU) 12 which interfaces one end of a T1 (1.544 Mb/s) time division multiplex (TDM) digital communications link 14. A second end of T1 TDM link 14 may be connected to another office, such as one containing an operational support system (OSS) 16, located remotely with respect to the office in which D4 channel bank 10 is installed.

Also contained in the D4 channel bank 10 is an office channel unit data port (OCU-DP) 18, which is coupled to LIU 12 via an intra D4 bank PCM communications link 15. OCU-DP 18 is configured to support a plurality of (e.g. twenty-four) channel units, which may be either analog channel units (analog cards) that source pulse code modulated analog (voice) signals, or digital channel units (digital cards) that source digital data, with each card being associated with a respective (64 Kb/s) time slot Ti of the T1 TDM link 14. (In accordance with industry standard card slot assignment identification, a respective card slot is identified by an associated time slot.) OCU-DP 18 is operative to interface bipolar signals on respective portions 21T and 21R of a local four-wire DS0 metallic (copper) link 21, which is coupled to a digital data service termination (DDST) 22, terminating the metallic loop 21 with a data service unit/channel service unit (CSU/DSU) 23 located at the customer's premises 20.

The LIU 12 and OCU-DP 18 within the D4 channel bank 10 include respective transmit/receive buffers associated with the respective ports of a respective channel unit. These buffers are controlled by a supervisory microcontroller for interfacing DS1-formatted data traffic from the T1 link side of the terminal, retiming the traffic as a bipolar data stream for transmission as a DS0 (bipolar) data stream or analog signals from the D4 channel bank 10 to the customer's site 20, and reconverting signals, supplied from the customer site 20 to OCU data port 18, into DS1 data frames for transmission over T1 link 14 to the remote site.

The component and bus architecture through which LIU 12 and OCU-DP 18 of D4 channel bank 10 communicate with one another by way of PCM communications link 15 is diagrammatically shown FIG. 2. As shown therein, a respective channel unit 19 has a transmitter section 31 and a receiver section 33. In the case of a digital channel unit, DS0 data from the four wire metallic loop 21 is supplied from the customer site termination equipment. In the case of an analog card, the transmit section 31 is coupled to receive incoming analog (voice) signals. Similarly, for a digital channel unit, receiver section 33 couples DS0 data to four wire metallic loop 21 for delivery to the customer site termination equipment. For an analog card the receiver section 33 supplies analog signals to the local loop.

To provide for intrabank communications between a channel unit 19 and the line interface unit 12, respective transmit and receive units 35 and 34 are employed. To accommodate installation of a digital card in a respective the backplane card/time slot, a set of transmission links 40 couple transmit section 31 to a transmit unit 35. Transmission links 40 include an ATDATA bus 44 and a DTDATA bus 45. ATDATA bus 44 is employed to transport encoded PAM signals from an analog channel unit to transmit unit 35, while DTDATA bus 45 is employed to transport serialized digital data bits from a digital channel unit to transmit unit 35, during a respective time slot Ti assigned to that channel unit.

Transmission links 40 further include a set of transmit sequence control leads 41 on which transmission control signals TX_CNTL signals from transmit unit 35 are asserted for controlling the format of data transmissions from the channel unit. Link 42 is a clock lead on which a transmit clock signal TD-CLK is asserted by transmitter section 31. In response to the control and clock signals on links 41 and 42, the transmitter section 31 of a digital channel unit decodes its respective channel select strobe and transmits data packets onto transmit data DTDATA bus 45 in a respective one of a plurality (e.g. 24) multiplexed channel unit time slots of a multi-channel (e.g. 24 channel) unit digroup within the D4 bank.

Pursuant to industry (AT&T-defined) communication standards, the channel select strobe occurs at an 8 KHz rate, so that with an eight bit byte being asserted for each strobe, a 64 Kb/s (DS0) channel is provided for a respective DS1 line. As data is serialized out over the DTDATA bus 45, transmit unit 35 collects the 192 bits (comprised of eight bits from each of the (24) channel units), appends a framing bit, and outputs the resulting DS1-formatted (193 bit) PCM data stream onto a TPCM link 51, and an associated transmit clock signal via TCLK link 53 to the LIU 12. The line interface unit 12 couples the formatted DS1 data onto the digital T1 carrier for transmission over link 14.

Transmission links 40 further include a transmit enable (TNEN) lead 43, which is coupled through a pull-up resistor 46 to a prescribed high (logical '1' state representative) voltage level $V_H$. As a result of this pull-up resistor 46, in the absence of any card being installed in a card/time slot of interest, the TNEN lead 43 will be normally in a logical high or '1' state during that time slot. When a channel unit is installed in a respective time/card slot, it identifies itself as either a digital channel unit or an analog channel unit by establishing the logical state of the TNEN lead 43 to a logical '1' or a logical '0' during its respective time slot.

In particular, if the installed channel unit is a digital channel unit, the TNEN lead remains in its normally pulled up logical high or '1' state, described above. With the TNEN lead 43 being a logical '1', the transmit unit 35 is instructed to pass (digital) data that has been asserted onto the DTDATA bus 45 by the digital channel unit over a PCM lead 51 to the LIU 12. On the other hand, if the installed channel unit is an analog channel unit, it asserts a low (logical '0' state representative) voltage on the TNEN during its time slot. When the transmit unit reads the logical state of the TNEN lead 43 as a logical '0', it infers that the channel unit for the time slot of interest is an analog channel unit, and proceeds to encode the analog state of the ATDATA bus 44 (which presumably corresponds to PAM data sourced from an analog channel unit of interest) into PCM format, and assert that encoded data over the PCM lead 51 to the LIU 12.

On the DS1 receive side, incoming T1 carrier signals from link 14 are received by line interface unit 12, and extended superframe format is converted into superframe formatted signals, as necessary. Payload or signalling bits are not altered. The DS1 data is asserted onto a receive RNPCM bus 61, which is coupled to receive unit 34 and to the receiver section 33 of each channel unit of the D4 channel bank. The DS1 clock within the T1 data is recovered by LIU 12 and applied as a recovered clock signal on RCLK link 63, which is also coupled to receive unit 34 and to the receiver section 33 of each channel unit 19.

The receive unit 34 synchronizes its timing with the DS1 framing pattern of the received signal and supplies channel unit control signals over RX_CNTL link 65 to the receiver section 33 of each channel unit in the D4 bank. This allows each channel unit to decode its channel select strobe for the received data and to extract its signals from the associated time slot of RNPCM data bus 61. In the case of an analog channel unit, the received PCM data is converted into analog format for delivery to the customer's analog equipment.

As pointed out above, in order to determine whether a channel unit installed in a respective card/time slot of the channel bank is a digital channel unit or an analog channel unit, the transmit unit 35 reads the state of the TNEN lead 43. Since the default (logical '1') state of the TNEN lead 43 is not changed by the installation of a digital channel unit, the transmit unit 35 will not assert PCM encoded PAM analog data derived from the ATDATA bus 44 onto the PCM lead 51, unless the TNEN lead 43 is in a logical '0' state.

Now although the intended operation of analog channel unit is to actively pull the TNEN lead low only during its associated time slot, it also does so upon power-up, when first installed into its card slot. Indeed, in the course of 'booting up' after being inserted into the channel bank, the analog card is prone to assert a logical low condition on the TNEN lead for a period of time that overlaps or 'bleeds' into one or more time slots of other channel units. As a result, during such time slots the logical '0' state of the TNEN lead will cause the transmit unit 35 to infer that it is to read the ATDATA bus 44, rather than the DTDATA bus 45. If the overlapped time slots during which the TNEN lead is asserted low by the newly installed analog channel unit are associated with digital channel units, the transmit unit's reading of the ATDATA bus 44 will cause the serialized digital data bits that should have been passed directly from the DTDATA bus 45 to the PCM bus 51 to be erroneously replaced with inadvertently PCM encoded spurious noise on the analog PAM lead, commonly termed 'bank hits', thereby corrupting the digital data that should have been transmitted. This causes customers with live data circuits to experience retransmission errors and sometimes request discounts from the service provider for errored seconds in the circuit.

SUMMARY OF THE INVENTION

In accordance with the present invention, this problem is successfully addressed by sampling and analyzing the channel bank's transmit enable (TNEN) lead during successive periods of time for successive frames of time slots, and determining therefrom whether an analog channel unit is installed in a D4 channel bank slot. Unless a valid determination is made that an analog channel unit is installed in a respective time slot, the PCM data lead remains default-coupled to the DTDATA bus, thereby preventing corruption of digital data.

For this purpose, the channel bank's TNEN lead is coupled to a sampling unit, which contains a plurality of sampling flip-flops, the clock enable inputs of which are coupled to receive respective clock enable signals at sequentially spaced apart instances within the time interval or window of a respective channel time slot. The outputs of the sampling flip-flops are coupled to a majority M-out-of-N decoder, which produces an output representative of a majority of the samples to prevent a spurious data sample from providing an invalid result. The output of the M-out-of-N decoder is supplied to a sequentially clocked, multi-stage shift register, that provides an effective delay equal to one frame of data (e.g., twenty-four time slots). Upon exiting the frame delay shift register, the delayed majority decision TNEN lead sample value is clocked through a time alignment flip-flop, the output of which represents the logic state value of the TNEN lead for an immediately preceding frame $F_{i-1}$.

This logic state of the TNEN lead for the immediately preceding frame $F_{i-1}$ and the current state of the TNEN lead for the current frame $F_i$ are applied to a TNEN-comparator. If both inputs to the TNEN-comparator are '0', then it is inferred that during the same time slot for each of successive frames $F_{i-1}$ and $F_i$, the TNEN lead was validly pulled low by an analog channel unit, and therefore the card/time slot of interest contains an analog channel unit. However, if one of the inputs to the TNEN-comparator is a logical '1', then it is inferred that the card/time slot of interest contains a digital channel unit, regardless of the state of the TNEN lead for the current frame $F_i$.

The output of the TNEN-comparator is coupled to the select input of a data bus-selecting multiplexer. The data bus-selecting multiplexer has one input coupled to the DTDATA bus, and another input coupled to a PCM-converted data lead, over which PCM-encoded analog data encoded from the ATDATA bus is supplied. If the output of the TNEN-comparator is a logical '0', indicating that a valid determination has been made by the TNEN-comparator that the channel unit associated with the time slot of interest is an analog channel unit, the select input to the multiplexer causes the multiplexer to couple the PCM-converted data lead to an output flip-flop, so that the PCM-converted data may be clocked out for application to the PCM link. On the other hand, if the logic level of the select input to the multiplexer is a logical '1', indicating that the TNEN-comparator has determined that the channel unit associated with the time slot of interest is a digital channel unit, then the data multiplexer couples the DTDATA bus to the output flip-flop.

DETAILED DESCRIPTION

Figure 1:
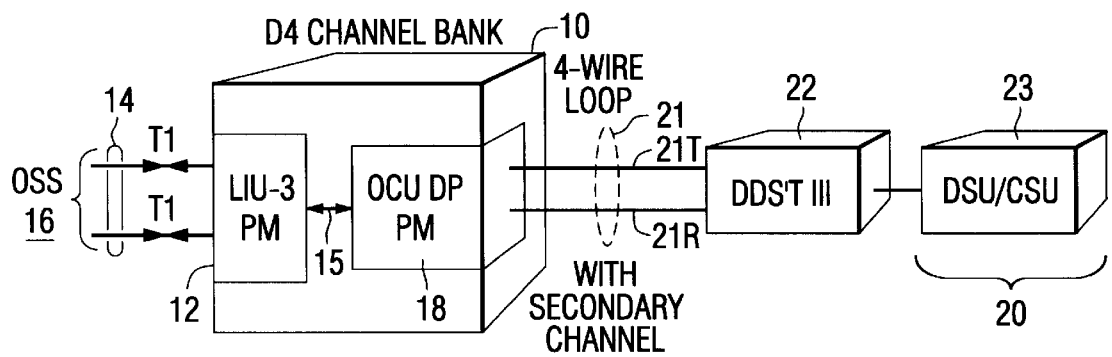
FIG. 1 diagrammatically illustrates an AT&T-compatible D4 channel bank installed in a typical digital carrier telephone network, through which digital/analog services may be provided by the network to digital signalling equipment located at a customer's premises.

Before describing in detail the multiframe TNEN lead sampling, comparison and data lead selection scheme in accordance with the present invention, it should be observed that the invention resides primarily in a minor hardware augmentation of bus interface circuitry of a conventional D4 channel bank, together with an augmentation of the communications control software employed by the channel bank's supervisory performance monitoring controller, so as to prevent the potential corruption of digital data being sourced from a digital channel unit. The details of the circuitry of the line interface unit and channel units remain unaffected.

Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 2:
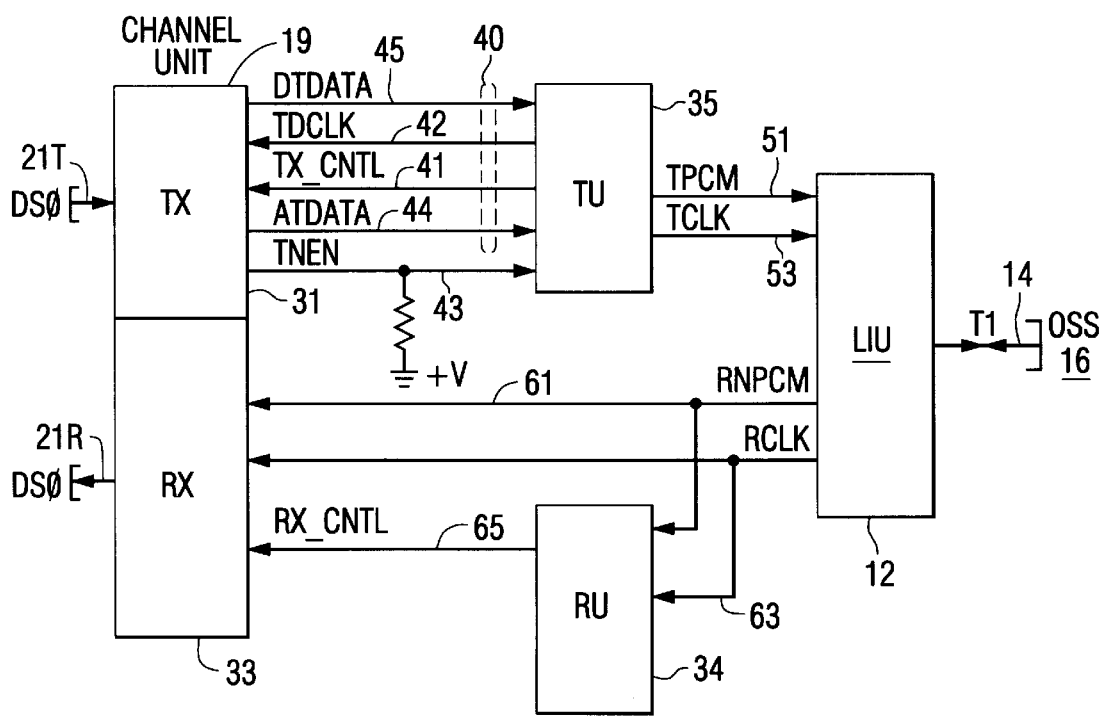
FIG. 2 diagrammatically shows the manner in which a line interface unit and an office channel unit data port of a D4 channel bank communicate with one another by way of a PCM communications link.
Figure 3:
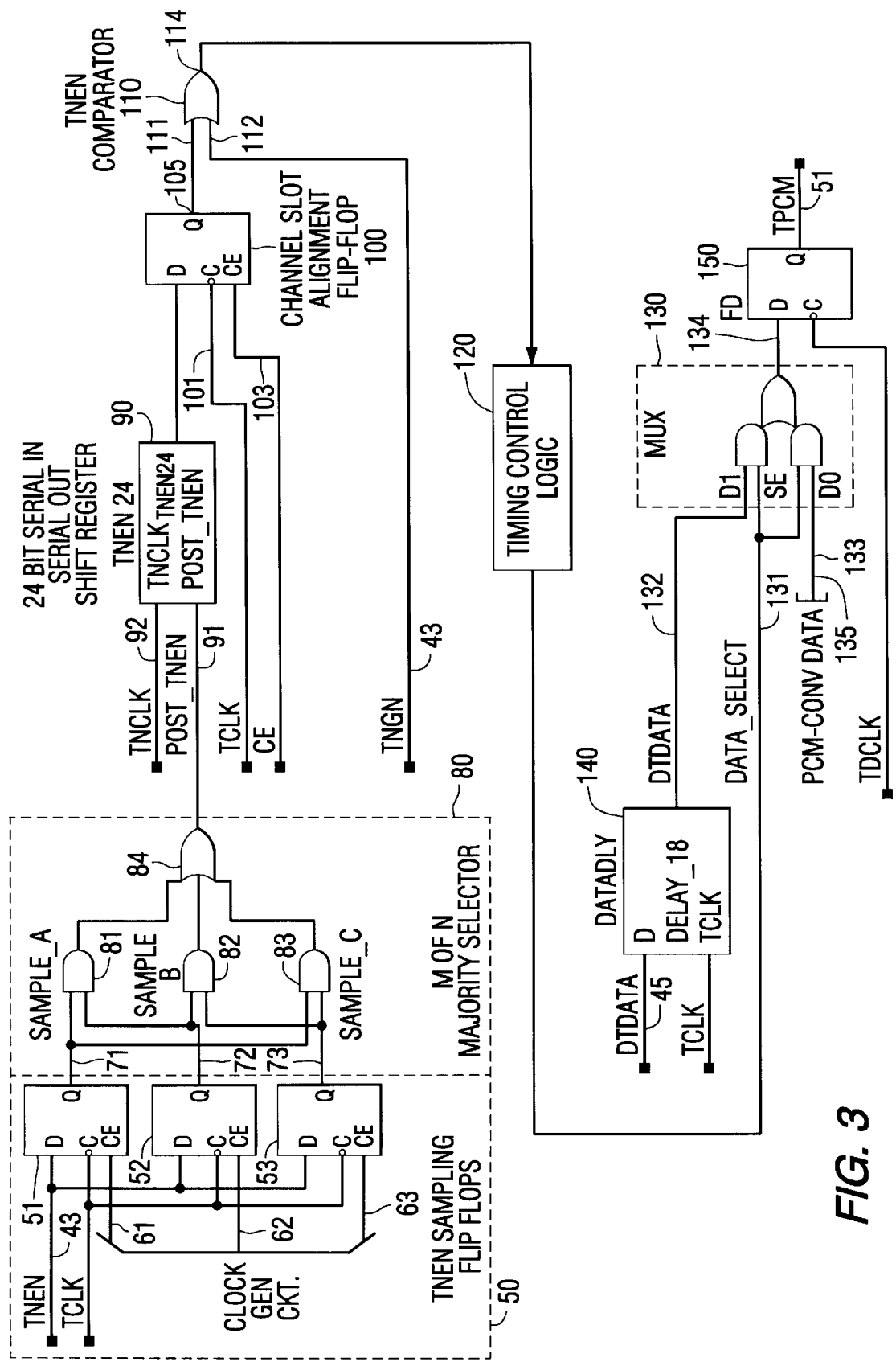
FIG. 3 is a diagrammatic illustration of the composition and interconnection of the signal processing components of the multiframe TNEN lead sampling, comparison and data lead selection scheme in accordance with the present invention.

FIG. 3 diagrammatically illustrates the manner in which the circuitry and data bus architecture of FIG. 2, described above, are modified in accordance with the invention, for the purpose of conducting multiframe sampling and analysis of the channel bank's transmit enable (TNEN) lead and making a valid determination whether an analog channel unit is installed in a D4 channel bank slot. As shown in FIG. 3, the TNEN lead 43 is coupled to a sampling unit 50, which contains a plurality (three in the non-limiting example shown) of sampling flip-flops 51, 52, and 53. In particular, the TNEN lead 43 is coupled to the D input of each of flip-flops 51, 52 and 53, clock enable CE inputs of which are coupled to respective clock signal leads 61, 62 and 63 from the channel bank's clock generation circuitry. Clock enable signal leads 61, 62 and 63 are used by the channel bank controller to provide clock enable signals at sequential instances in time relative to the start of a respective channel time slot. As a non-limiting example, the clock enable lead 61 changes state 1620 ns after the start of a time slot, lead 62 changes stage 1296 ns after the clock enable signal on lead 61, and lead 63 changes stage 1296 ns after the clock enable signal on lead 62.

The Q outputs 71, 72 and 73 of the respective sampling flip-flops 51, 52 and 53 are coupled as TNEN samples A, B and C in respectively different pairs to a majority M-out-of-N selector or decoder 80, such as a majority two-out-of-three decoder in the illustrated example, comprised of AND gates 81, and 82 and 83, the outputs of which are coupled to OR gate 84. As pointed out briefly above the use of an M-out-of-N majority decision prevents a spurious data sample from providing an invalid result. This 'debounced' output of OR gate 84 will be a logical '1' if the output of any of the AND gates 81, 82 and 83 is a logical '1'; otherwise, the output of OR gate 84 will be a logical '0'.

The output POST_TNEN of OR gate 84 is coupled to the serial data input 91 of a sequentially clocked, multi-stage shift register 90, the effective delay through which corresponds to one frame of data (e.g., twenty-four time slots equivalent to a duration of 125 $\mu$sec). For this purpose, shift register 90 may comprise twenty-four, cascaded flip-flops, through which the majority M-out-of N decision data value produced by OR gate 84 is sequentially clocked by a clock signal TNCLK applied to its clock input 92. Upon being clocked out of shift register 90, this delayed majority decision data value is clocked into a time alignment flip-flop 100, in accordance with a clock signal TCLK applied to its clock input 101 and a clock enable CE input applied to its clock enable input 103 324 ns after the start of a respective time slot Ti.

The Q output 105 of flip-flop 100, which represents the logic level value of the TNEN lead 43 for an immediately preceding frame $F_{i-1}$ is coupled to a first input 111 of a TNEN-comparing OR gate 110. A second input 112 of OR gate 110 is coupled to the TNEN lead 43. If both inputs 111 and 112 to OR gate 110 are '0', then its output 114 will also be '0', and it is inferred that the card/time slot of interest contains an analog channel unit. However, if one of the inputs 111 and 112 to OR gate 110 is a '1', then the output 114 of OR gate 110 will be a '1', and it is inferred that the card/time slot of interest contains a digital channel unit, regardless of the present state of the TNEN lead 43.

The output 114 of TNEN-comparing OR gate 110 is clocked through timing control logic circuit 120, which provides a time alignment delay of the logic output 114 of OR gate 110, and is applied therefrom to the select input 131 of a data bus-selecting multiplexer 130. Multiplexer 130 has a first port 132 coupled to the DTDATA bus 45 through a data delay flip-flop 140, and a second port input 133 coupled to a PCM-converted data lead 135, by way of which PCM-encoded analog data encoded from the ATDATA bus 44 is supplied. Because the default state is to pass digital data, the select input 131 is normally at a logic state "1', which causes the multiplexer 130 to couple the DTDATA bus input to its first port to its output 134. If the logic level of the multiplexer's select input 131 is a logical '0', indicating that a valid determination has been made by the TNEN-comparator 110 that the channel unit associated with the time slot of interest is an analog channel unit, multiplexer 130 couples the PCM-converted data on lead 135 to its output 134. The output 134 of the multiplexer 130 is applied to a flip-flop 150, through which the data is clocked out for application to the PCM link 51.

As will be appreciated from the foregoing description, the potential digital data corruption problem that accompanies the insertion of an analog card into a card/time slot of a D4 channel bank is effectively obviated in accordance with the present invention, which samples and analyzes the channel bank's transmit enable (TNEN) lead for successive frames of time slots, so as to produce a valid determination as to whether an analog channel unit is installed in a D4 channel bank slot. Unless analyzed TNEN lead samples of the channel unit time slot of interest for successive frames produce the same logical '0' state, indicating that an analog channel unit is installed in a respective time slot, the PCM data lead remains default-coupled to the DTDATA bus, thereby preventing inadvertently PCM-encoded spurious noise on the analog PAM lead from erroneously replacing serialized digital data bits that should have been passed directly from the DTDATA bus to the PCM bus.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. For use with a telephone communication network channel bank located at a first site and including a plurality of channel unit connector slots for installing one or more respective channel units, a respective channel unit communicating with a customer site over a communication path therebetween, and being operative, during a respective time slot, to transmit communication signals over an intra-channel bank communication link to a line interface unit, said intra-bank communication link including a lead, the state of which is asserted to a logic state representative of the type of said respective channel unit during said respective time slot, said line interface unit being operative to transmit digital communication signals over a time division multiplex communication link to a second site, a method of making a valid identification of the type of channel unit installed in said respective channel unit connector slot comprising the steps of:

(a) during respectively different time periods associated with said respective channel unit connector slot of said channel bank, sampling the state of said lead;

(b) determining the type of channel unit installed in said respective channel unit connector slot in accordance with a prescribed relationship between sampled states of said lead for said respectively different time periods associated with said respective channel unit connector slot; and wherein step (a) comprises sampling the state of said lead multiple times during each of said respectively different time periods associated with said respective channel unit connector slot of said channel bank and, for each of said respectively different time periods, defining the state of said lead in accordance with a majority decision of multiple samples of said lead.

2. A method according to claim 1, wherein step (b) comprises determining the channel unit installed in said respective channel unit connector slot to be a first type of channel unit in response to said majority decision for multiple sampled states of said lead having a first logic state for both of said respectively different time periods associated with said respective channel unit connector slot.

3. A method according to claim 2, wherein said first type of channel unit is an analog channel unit.

4. A method according to claim 2, wherein step (b) comprises determining the channel unit installed in said respective channel unit connector slot to be a second type of channel unit in response to said majority decision for multiple sampled states of said lead having a second logic state for at least one of said respectively different time periods associated with said respective channel unit connector slot.

5. A method according to claim 4, wherein said second type of channel unit is a digital channel unit.

6. A method according to claim 4, wherein said lead comprises a lead which normally pulled to a second logic state that is associated with a digital channel unit, and is asserted to said first second logic state by an analog channel unit.

7. A method according to claim 6, wherein step (b) comprises determining the channel unit installed in said respective channel unit connector slot to be an analog channel unit in response to said majority decision for sampled states of said lead having said first logic state for both of said respectively different time periods associated with said respective channel unit connector slot, but determining the channel unit installed in said respective channel unit connector slot to be a digital channel unit in response to said majority decision for sampled states of said lead having said second logic state for at least one of said respectively different time periods associated with said respective channel unit connector slot.

8. For use with a telephone communication network channel bank located at a first site and including a plurality of channel unit connector slots for installing a plurality of channel units, a respective channel unit communicating with a customer site over a communication path therebetween, and being operative, during a respective time slot, to transmit communication signals over an intra-channel bank communication link to a line interface unit, said intra-channel bank communication link including a digital data bus portion and an analog data bus portion, said intra-bank communication link further including a lead, the logic state of which is representative of the type of said respective channel unit during said respective time slot, said line interface unit being operative to transmit, over a time division multiplex communication link to a second site, communication signals that are provided on a selected one of said digital data bus portion and said analog data bus portion, in accordance with the logic state of said lead, a method of making a valid identification of the type of channel unit installed in said respective channel unit connector slot and thereby selecting said one of said digital data bus portion and said analog data bus portion of said intra-channel bank communication link for transmission of communication signals to said line interface unit, comprising the steps of:

(a) for successive frames of time slots, sampling the state of said lead during said respective time slot;

(b) determining the type of channel unit installed in said respective channel unit connector slot in accordance with a prescribed relationship between sampled states of said lead as sampled in step (a) during said respective time slot for said successive frames of time slots; and (c) selecting one of said digital data bus portion and said analog data bus portion of said intra-channel bank communication link for transmission of communication signals to said line interface unit, in accordance with the type of channel unit determined in step (b).

9. A method according to claim 8, wherein step (b) comprises determining the channel unit installed in said respective channel unit connector slot to be an analog channel unit, in response to said sampled states of said lead having a first logic state for plural ones of said successive frames.

10. A method according to claim 8, wherein step (b) comprises determining the channel unit installed in said respective channel unit connector slot to be an analog channel unit, in response to said sampled states of said lead having a first logic state for each of said successive frames.

11. A method according to claim 8, wherein step (b) comprises determining the channel unit installed in said respective channel unit connector slot to be a digital channel unit in response to said sampled states of said lead having said second logic state for at least one of said successive frames.

12. A method according to claim 8, wherein step (a) comprises sampling the state of said lead multiple times during said respective time slot for each of said successive frames, and defining the state of said lead for said respective time slot in a respective frame in accordance with a majority decision of multiple samples of said lead during said respective time slot in said respective frame.

13. A method according to claim 8, wherein said lead comprises a lead which normally pulled to said second logic state that is associated with a digital channel unit, and is asserted to said second logic state by an analog channel unit.

14. A method according to claim 13, wherein step (b) comprises determining the channel unit installed in said respective channel unit connector slot to be an analog channel unit in response to sampled states of said lead having said first logic state for successive frames, but determining the channel unit installed in said respective channel unit connector slot to be a digital channel unit in response to said sampled states of said lead having said second logic state for at least one of said successive frames.

15. A method according to claim 8, wherein step (c) comprises normally selecting said digital data bus portion of said intra-channel bank communication link for transmission of communication signals to said line interface unit, but selecting said analog data bus portion of said intra-channel bank communication link for transmission of communication signals to said line interface unit, in response to step (b) determining the type of channel unit installed in said respective channel unit connector slot to be an analog channel unit, based upon said prescribed relationship between sampled states of said lead as sampled in step (a) during said respective time slot for said successive frames of time slots.

16. For use with a telephone communication network channel bank located at a first site and including a plurality of channel unit connector slots for installing a plurality of channel units, a respective channel unit communicating with a customer site over a communication path therebetween, and being operative, during a respective time slot, to transmit communication signals over an intra-channel bank communication link to a line interface unit, said intra-channel bank communication link including a digital data bus portion and an analog data bus portion, said intra-bank communication link further including a lead, the logic state of which is representative of the type of said respective channel unit during said respective time slot, said line interface unit being operative to transmit, over a time division multiplex communication link to a second site, communication signals that are provided on a selected one of said digital data bus portion and said analog data bus portion, in accordance with the logic state of said lead, an arrangement for making a valid identification of the type of channel unit installed in said respective channel unit connector slot and selecting said one of said digital data bus portion and said analog data bus portion of said intra-channel bank communication link for transmission of communication signals to said line interface unit, comprising:

a sampling unit which is operative to sample the state of said lead during said respective time slot for successive frames of time slots;

a comparator which is operative to determine the type of channel unit installed in said respective channel unit connector slot in accordance with a prescribed relationship between sampled states of said lead as sampled by said sampling unit during said respective time slot for said successive frames of time slots; and a data bus portion selector which is operative to select one of said digital data bus portion and said analog data bus portion of said intra-channel bank communication link for transmission of communication signals to said line interface unit, in accordance with the type of channel unit determined by said comparator.

17. An arrangement according to claim 16, wherein said comparator is operative to identify the channel unit installed in said respective channel unit connector slot as an analog channel unit, in response to said sampling unit producing an output representing that the sampled states of said lead have a first logic state for plural ones of said successive frames.

18. An arrangement according to claim 16, wherein said comparator is operative to identify the channel unit installed in said respective channel unit connector slot as an analog channel unit, in response to said sampling unit producing an output representing that the sampled states of said lead have a first logic state for each of said successive frames.

19. An arrangement according to claim 16, wherein said comparator is operative to identify the channel unit installed in said respective channel unit connector slot as a digital channel unit in response to said sampling unit producing an output representing that the sampled states of said lead have said second logic state for at least one of said successive frames.

20. An arrangement according to claim 16, wherein said sampling unit is operative to sample the state of said lead multiple times during said respective time slot for each of said successive frames, and produces an output defining the state of said lead for said respective time slot in a respective frame in accordance with a majority decision of multiple samples of said lead during said respective time slot in said respective frame.

21. An arrangement according to claim 16, wherein said lead comprises a lead which normally pulled to said second logic state that is associated with a digital channel unit, and is asserted to said second logic state by an analog channel unit.

22. An arrangement according to claim 21, wherein said comparator is operative to identify the channel unit installed in said respective channel unit connector slot as an analog channel unit in response to said sampling unit producing an output representing sampled states of said lead as having said first logic state for successive frames, and identifying the channel unit installed in said respective channel unit connector slot as a digital channel unit in response to said sampling unit producing an output representing that sampled states of said lead have said second logic state for at least one of said successive frames.

23. An arrangement according to claim 16, wherein said data bus portion selector is operative to normally select said digital data bus portion of said intra-channel bank communication link for transmission of communication signals to said line interface unit, but is operative to select said analog data bus portion of said intra-channel bank communication link for transmission of communication signals to said line interface unit, in response to said comparator identifying the type of channel unit installed in said respective channel unit connector slot as an analog channel unit, based upon said prescribed relationship between sampled states of said lead as sampled by said sampling unit during said respective time slot for said successive frames of time slots.

* * * * *